United States Patent
Johnson et al.

(10) Patent No.: US 9,735,466 B2
(45) Date of Patent: Aug. 15, 2017

(54) ADVANCED COMPOSITE RADOME AND METHOD OF MANUFACTURING

(71) Applicant: Ebert Composites Corporation, Chula Vista, CA (US)

(72) Inventors: David W. Johnson, San Diego, CA (US); Scott A. Garrett, San Diego, CA (US); Stephen G. Moyers, Jamul, CA (US)

(73) Assignee: Ebert Composites Corporation, Chula Vista, CA (US)

( * ) Notice: Subject to any disclaimer, the term of this patent is extended or adjusted under 35 U.S.C. 154(b) by 182 days.

(21) Appl. No.: 14/333,182

(22) Filed: Jul. 16, 2014

(65) Prior Publication Data

US 2015/0022423 A1    Jan. 22, 2015

Related U.S. Application Data

(60) Provisional application No. 61/847,914, filed on Jul. 18, 2013.

(51) Int. Cl.
*H01Q 1/42* (2006.01)
*B29C 65/56* (2006.01)
(Continued)

(52) U.S. Cl.
CPC ............ *H01Q 1/42* (2013.01); *B29C 65/562* (2013.01); *B29C 66/1142* (2013.01);
(Continued)

(58) Field of Classification Search
CPC ............ H01Q 1/42; B29C 53/04; B29C 65/56
See application file for complete search history.

(56) References Cited

U.S. PATENT DOCUMENTS

| 4,716,704 A * | 1/1988 | Murr ................... E04F 19/065 |
| | | 52/471 |
| 6,911,955 B2 * | 6/2005 | Fossey, Jr. ............... B32B 5/26 |
| | | 343/872 |

(Continued)

FOREIGN PATENT DOCUMENTS

| EP | 2329939 A2 | 6/2011 |
| JP | S55-36649 | 3/1980 |

(Continued)

OTHER PUBLICATIONS

PCT/US2014-047035, International Search Report, Korean Intellectual Property Office, Nov. 6, 2014.
(Continued)

*Primary Examiner* — Graham Smith
*Assistant Examiner* — Noel Maldonado
(74) *Attorney, Agent, or Firm* — Procopio Cory Hargreaves and Savitch LLP; Stephen C. Beuerle

(57) ABSTRACT

A radome for housing a radar system comprises a plurality of interconnected curved radome thermoplastic composite material panels, each curved radome thermoplastic composite material panel having a plurality of interconnecting edges, a foam core, an inner skin, an outer skin, and a plurality of three-dimensional fiber bundles tying the inner skin and the outer skin to each other through the foam core, inhibiting delamination. The radome includes a hydrophobic exterior surface that is self-cleaning and requires zero maintenance for 25 years.

16 Claims, 11 Drawing Sheets

(51) Int. Cl.

| | | |
|---|---|---|
| *B29C 65/00* | (2006.01) | |
| *B29C 70/08* | (2006.01) | |
| *B29C 67/00* | (2017.01) | |
| *F16B 5/00* | (2006.01) | |
| *B29L 31/00* | (2006.01) | |
| *B29K 309/08* | (2006.01) | |
| *B29K 105/00* | (2006.01) | |
| *B29K 67/00* | (2006.01) | |
| *B29L 31/34* | (2006.01) | |
| *B29C 51/26* | (2006.01) | |

(52) U.S. Cl.
CPC .......... *B29C 66/543* (2013.01); *B29C 66/721* (2013.01); *B29C 66/72141* (2013.01); *B29C 66/7392* (2013.01); *B29C 66/73921* (2013.01); *B29C 66/8246* (2013.01); *B29C 66/83221* (2013.01); *B29C 67/0044* (2013.01); *B29C 70/086* (2013.01); *F16B 5/0012* (2013.01); *H01Q 1/424* (2013.01); *B29C 51/268* (2013.01); *B29C 66/43* (2013.01); *B29C 66/71* (2013.01); *B29C 66/723* (2013.01); *B29C 66/7212* (2013.01); *B29K 2067/003* (2013.01); *B29K 2105/256* (2013.01); *B29K 2309/08* (2013.01); *B29K 2995/0094* (2013.01); *B29L 2031/3456* (2013.01); *B29L 2031/773* (2013.01); *Y10T 156/1036* (2015.01)

(56) References Cited

U.S. PATENT DOCUMENTS

| | | |
|---|---|---|
| 2002/0166294 A1 | 11/2002 | Rogers |
| 2008/0143633 A1* | 6/2008 | Jacoletti ................ H01Q 19/12 343/872 |
| 2010/0173118 A1 | 7/2010 | Johnson et al. |
| 2011/0109523 A1 | 5/2011 | Stresing et al. |

FOREIGN PATENT DOCUMENTS

| | | |
|---|---|---|
| JP | 2003168910 | 6/2003 |
| WO | WO2005015683 | 2/2005 |

OTHER PUBLICATIONS

Extended European Search Report for European patent application No. 14825611.8 dated Feb. 7, 2017.

\* cited by examiner

ADVANCED COMPOSITE RADOME AND METHOD OF MANUFACTURING

CROSS-REFERENCE TO RELATED APPLICATIONS

This application claims priority to U.S. Provisional Patent Application No. 61/847,914 filed Jul. 18, 2013 under 35 U.S.C. 119 and is incorporated by reference herein.

GOVERNMENT LICENSE RIGHTS

This invention was made with government support under Contract Nos. FA8201-08-C-0037, FA8224-10-C-0025, FA8222-12-C-0021 awarded by the United States Air Force. The government has allowed the applicant certain rights in the invention, as this is an Small Business Innovative Research (SBIR) contract. Any government rights, such as "March-In-Rights" would be subject to specific language in the Air Force contract.

FIELD OF THE INVENTION

The present invention relates generally to radomes and particularly to radomes made of composite materials.

BACKGROUND OF THE INVENTION

The Air Force, as well as many government agencies, utilizes protective radomes to enclose its multitude of land-based radar systems, worldwide. These radomes protect radar from extreme weather and environmental attack. They must perform this task, while being transparent to all specified radar frequencies. Furthermore, these radomes must minimize maintenance during a 25-year life and must be structurally resistant to damage from transportation-to-site, installation-handling, maintenance, abuse, environmental conditions, and long-term operations.

The current radome technology used by the Air Force is based upon a series of no-win design decisions made 30 years ago. The sandwich panels are made from a crude lay-up process, incorporating thin fiberglass skins and thermoset resins, with a foam core. This process, coupled with the thin skins and weak bonding to the foam core, commonly causes delamination of the skin from the core during transportation, installation, and maintenance. Furthermore, in order to allow the radar system to perform well in rain, these radomes must exhibit hydrophobic properties to prevent accumulation of a conductive sheet of water that negatively impacts radio frequency (RF) transparency. Therefore, radomes are typically coated with hydrophobic paints. Over time, ultraviolet (UV) exposure and air pollution typically attack the painted coatings, and gel coatings, of existing radomes, degrading the hydrophobic properties. This in turn leads to poor transparency of signals and marginal or unacceptable radar performance. This is addressed by continual repainting, a costly process which involves power washing of radomes, exposing a site to paint-debris waste. The cost of this periodic maintenance to the Air Force can run into hundreds of millions of dollars. Finally, a typical Air Force radome made with 30-year old design standards, not only requires regular painting maintenance, but is also prone to impact and wind damage, further requiring replacement of delaminated radome sections.

SUMMARY OF THE INVENTION

The present invention, which solve these problems, utilizes an advanced thermoplastic sandwich technology that incorporates innovative, non-delaminating 3D composite sandwich technology, trademarked as Transonite®. This 3D composite sandwich technology, together with a specialized film coating process, addresses the need for a durable non-delaminating structure that exhibits superior hydrophobic surface characteristics and requires no maintenance for a minimum period of 25 years. A third innovation is incorporating the above with a new, impact-resistant, thermoplastic composite sandwich material fabricated in a proprietary continuous pultrusion process.

An aspect of the invention involves a radome for housing a radar system, comprising a plurality of interconnected curved radome thermoplastic composite material panels, each curved radome thermoplastic composite material panel having a plurality of interconnecting edges, a foam core, an inner skin, an outer skin, and a plurality of three-dimensional fiber bundles tying the inner skin and the outer skin to each other through the foam core, inhibiting delamination. The curved panels are typically spherical, resulting in a spherical radome, once all panels are connected.

One or more implementations of the above aspect of the invention involve one or more of the following: the interconnecting edges are thermoformed and taper inwardly and outwardly, and terminate in elongated strips; the elongated strips are co-molded thermoformed elongated composite material strips made of the same composite material as the inner skin of the curved radome composite material panel; the composite material strips include a foam core, an inner skin, an outer skin, and a plurality of three-dimensional fiber bundles extending through and reinforcing the foam core from the inner skin to the outer skin; curved connecting joints interconnecting the plurality of interconnected curved radome composite material panels along the interconnecting edges, each curved connecting joint including an outer spline, an inner spline and a plurality of fasteners holding the outer spline, inner spline and adjacent composite material strips from adjacent radome composite material panels together; the outer spline and the inner spline include respective holes for receiving the fasteners, and the holes of the outer spline and the holes of the inner spline are offset from each other to cause a curved configuration in connected outer spline and inner spline; the outer spline and the inner spline are made of either a thermoplastic composite or a pultruded thermoset composite. The outside splines may have the head of a fastener buried and bonded into the spline, with the same hydrophobic fabric/film applied over the outside of the spline with traditional adhesives. This minimizes water penetration, eliminating upwards of 2500 holes exposed to the potential for rain-water-penetration. Each radome composite material panel includes an outer hydrophobic coating, which could be any number of films or fabrics, however a preferred hydrophobic coating involves co-curing in the composite process a material that has polytetrafluoroethylene (PTFE) on one-side (OS) and woven fiberglass material on the other side. There are a number of companies around the world supply this material, and the PTFE has superior weathering and hydrophobic properties. The fabrics have typically not been co-cured with other composite skins, nor integrated into a sandwich radome, and typically been used for inflatable radomes, incorporating the fabric by itself. The fabrics have shown superior resistance to UV exposure and are self-cleaning. Many have been installed with zero maintenance for 25 years or more. 0; the radome composite materials are RF-transparent A-sandwich composite material panels, although the technology herein could apply to solid or other types of traditional RF-transparent designs; a method of manufacturing the radome includes manufacturing each interconnecting edge of the curved radome composite material panel, one entire interconnecting edge at a time, with an edge forming tool; manufacturing each interconnecting edge includes receiving one entire interconnecting edge at a time by upper and lower curved clamping elements of the edge forming tool; heating the entire interconnecting edge by the upper and lower curved clamping elements of the edge forming tool; forming the entire interconnecting edge by the upper and lower curved clamping elements of the edge forming tool; cooling the entire interconnecting edge with the edge forming tool; manufacturing the radome includes interconnecting the plurality of interconnected curved radome composite material panels along the interconnecting edges with curved connecting joints; the curved connecting joints include an outer spline, and an inner spline, and interconnecting the plurality of interconnected curved radome composite material panels includes coupling adjacent composite material strips from adjacent radome composite material panels together with the outer spline, the inner spline, and a plurality of fasteners that connect the outer spline and the inner spline together; and/or the outer spline and the inner spline include respective holes for receiving the fasteners, and the holes of the outer spline and the holes of the inner spline are offset from each other, and connecting the outer spline and the inner spline together includes connecting the outer spline and the inner spline together so that the holes of the outer spline and the holes of the inner spline are offset from each other so as to cause a curved configuration in connected outer spline and inner spline. This interconnected edge may be thermoformed into other connecting joints such as flat over-lapping flanges (with additional material added for strength or nothing added for strength since in the above aspect of the invention excellent load transfer from the spline to the entire inner and outer skins is provided). Additionally there is a low profile on the splines to prevent water buildup channeling at the connection, and adversely affect radar transmission. An additional feature of the spline is that a single panel can be removed from the interior. Traditional panels with overlapping connecting flanges cannot allow a single panel to be replaced without disassembling several. A further advantage of the interconnecting joint is the low profile and narrow design, minimizing the disruption the joint may have to the rotating radar. Additionally, a tuning material can be added to the splines to achieve a reduction in overall db-loss of the radar, as compared to no tuning material added. The splines can also be pultruded with features that allow the addition of sealing strips, typically silicone rubber with adhesive on one side, facing the spline, such that the sealing strips can be bonded to the splines, prior to installation; the purpose of such sealing strips is of course to minimize or eliminate water intrusion into the radome due to rain, curved radome thermoplastic composite material is made up of e-glass fiber and a heatable thermoplastic resin thermoformed into a specific shape, cooled, and set into a shape post-cooling. The thermoplastic resin is at least one of polyethylene terephthalate glycol-modified (PETG) and polyethylene terephthalate (PET). The inner skin includes two 0.015-0.025 inch thick PETG resin and glass fiber layers, forming a substantially 0.040 inch thick inner skin and wherein the plurality of three-dimensional fiber bundles include ends that are tied and thermocured between the two layers. The outer skin includes one 0.015-0.025 inch thick PETG resin and glass fiber layer and one 0.015-0.025 inch thick fabric layer of hydrophobic material including an outside with PTFE and an inside with woven glass fiber, forming a substantially 0.040 inch thick outer skin, and wherein the plurality of three-dimensional fiber bundles include ends that are tied and thermocured between the two layers. The foam core is PET foam. The interconnecting edges are thermoformed and taper inwardly and outwardly, and terminate in a butt joint, wherein the butt joint is in effect a tooth formed in the shape of a great circle, as defined by a diameter of the radome. The radome forms a rhombic triacontahedron with individual identical panels. The butt joints of two adjoining panels form a contact plane that is substantially at 90 degrees to a surface of the radome.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

With reference to FIGS. 1-11, an embodiment advanced composite radome will be described.

The family of radomes of interest are the A-Sandwich radomes that are radio frequency ("RF") transparent, and are generally thinned skinned glass fiber reinforced composite sandwich structures with a foam core. The foam core is RF transparent and is defined as approximately ¼ the wavelength of the radar being covered and protected.

Figure 1:
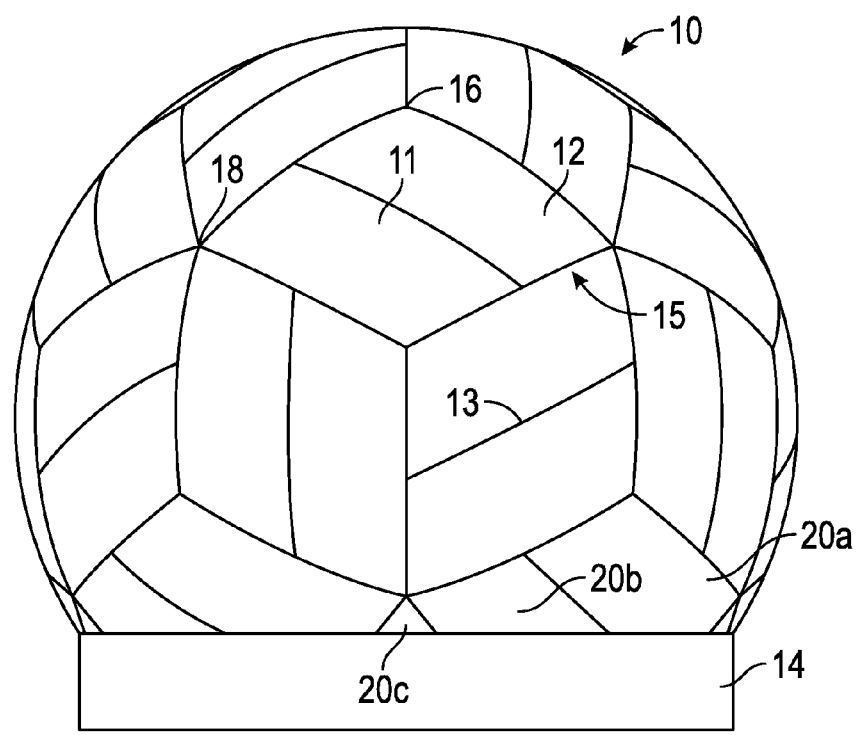
FIG. 1 shows a side view of an embodiment of a composite radome, in one configuration, with a truncated base for flat-platform assembly and installation.

In FIG. 1, the radome 10 is shown in side elevation with a truncated base. For discussion purposes the specific configuration, diameter, wall thickness and details will be discussed, but, in alternative embodiments, these details and parameters can be changed.

FIG. 1 is a rhombic triacontahedron design, but clearly could be any of a variety of radome configurations in which panels are defined and connected into a perfect sphere. It turns out a rhombic triacontahedron of the configuration shown has in a full sphere 60 identical panels that when assembled form a perfect sphere.

The radome of FIG. 1 is specifically an assembled advanced composite radome measuring in outside diameter at 32.00 feet, but clearly could be scaled to any diameter, and having sandwich panels that are 1.080 inches thick. The radome 10 is truncated at its base 14, such that the radome 10 can be installed on a flat mounting ring of approximately 27 feet in diameter. Typically a radome may be truncated at 85% of its diameter, meaning the distance from the top of radome 10 to the base 14 would be 85% of the diameter of the radome. The radome 10 of FIG. 1 is at approximately 77% of its actual diameter.

There are 15 truncated panels that are necessary to connect to the mounting base 14 and elements 20a, 20b, and 20c show three of these truncated panels. All truncated panels are made from the same base panel that otherwise would be one of the 60 referenced identical panels. A full panel is shown as 12. There would be 60 panels 12 in a full spherical radome that is not truncated. Two panels 12, when put together, form a rhombic face. There are thirty identical faces 15 in a Rhombic triacontahedron. Panel 11 is identical to panel 12, but simply rotated 180 degrees. The combination of panels 11 and 12, when connected, produce a rhombic face 15, and thus thirty of these faces 15 can make the full sphere. Essentially, the rhombic face 15 has been split and two identical panels 11 and 12 have been produced, rotated, and connected to make the rhombic face. Since all panels that are not truncated are identical, these panels will be referred to as 12.

Connecting edge/joint 13 between two panels 12 is shown as a line, but, in fact, is a connecting joint that will be described further later when discussing FIGS. 6, 7, 8, 19, and 20. Also shown in FIG. 1 are "star" joints 18 where multiple panels 12 meet in a point. Star joint 18 shows five panels coming together in a point and joint 16 shows three panels coming together in a point.

Figure 2:
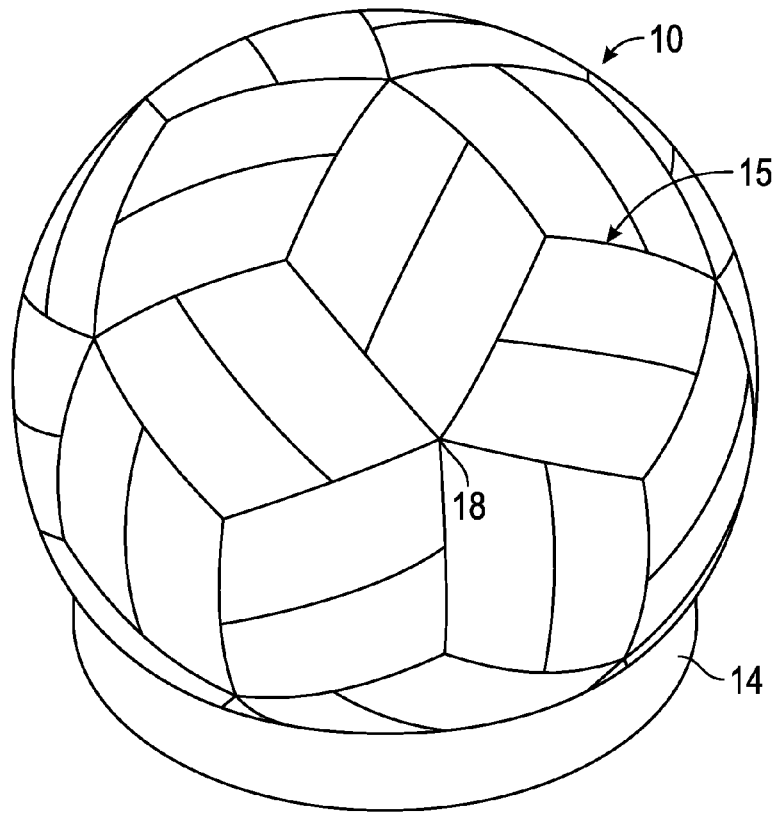
FIG. 2 shows a perspective view of FIG. 1, but with a slightly higher elevation.

FIG. 2 shows a higher elevation of FIG. 1 showing the radome 10 with the base 14. FIG. 2 gives an alternate view of the radome panel configuration, as well as a better view of the rhombic faces 15 coming together in a star joint 18.

Figure 3:
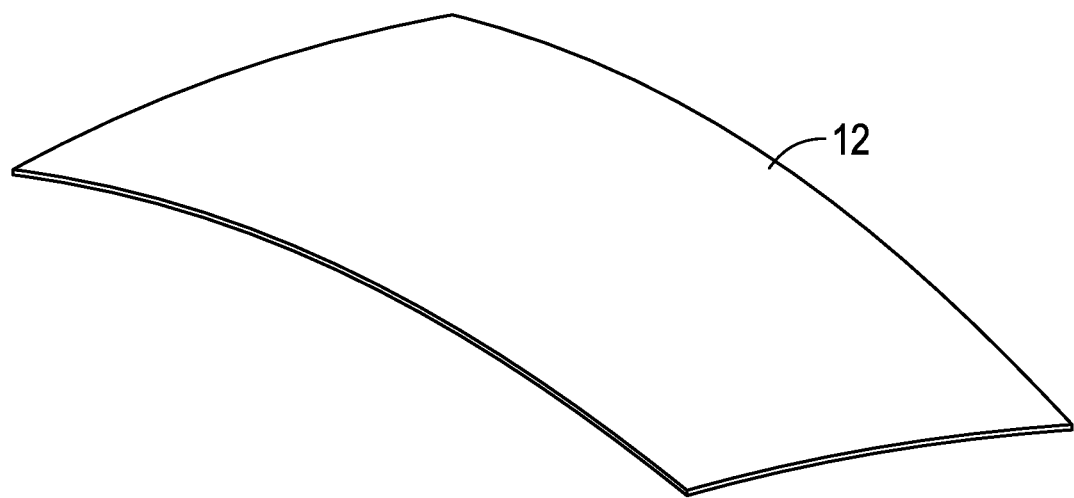
FIG. 3 illustrates an isometric view of an embodiment of one panel of the radome of FIG. 1.
Figure 11:
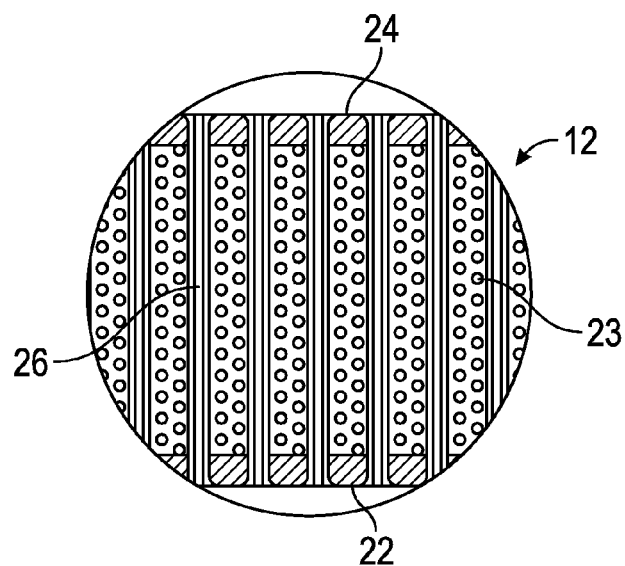
FIG. 11 is a cross-sectional view of an embodiment of the composite material panel with Z-axis fiber bundles shown.

FIG. 3 shows panel 12 from FIG. 1 in a larger isometric view and FIG. 11 show a close-up cross-sectional view. The panel 12 includes an outer skin 24 with an outer hydrophobic coating or film, a foam core 23, and an inner skin 22. The hydrophobic coating or film on the outside ensures a clean surface that will not weather or deteriorate with UV exposure, and will constantly bead water in rain for superior RF performance.

The outer hydrophobic coating involves co-curing in the composite process a material that has polytetrafluoroethylene (PTFE) on one-side (OS) and woven fiberglass material on the other side. The PTFE has superior weathering and hydrophobic properties. The fabrics have typically not been co-cured with other composite skins, nor integrated into a sandwich radome, and typically been used for inflatable radomes, incorporating the fabric by itself. The fabrics have shown superior resistance to UV exposure and are self-cleaning. Many have been installed, with zero maintenance for 25 years, or more. In alternative embodiments, the outer hydrophobic coating may be any number of films or fabrics.

The fiberglass weave on the inside of the OS fabric accepts the thermoplastic resin (when the panel is fabricated in the thermoplastic pultrusion process described in U.S. Pat. Nos. 8,123,510, 8,353,694, 8,684,722, and 8,747,098, which are incorporated by reference herein). As such, the fabric becomes part of the skin. Thus, the PTFE is on the outside and the glass woven material is on the inside so that the weave gets impregnated with liquid thermoplastic resin, which becomes cured and integrated as part of the skin Unique to the panel 12 are 3D fiber bundles 26 that tie the skins 22, 24 to the core 23, preventing delamination. Multiple arrays of 3D fibers 26 have been tested and found they do not interfere with the radar transparency. This non-delaminating 3D composite sandwich technology is incorporated into the panel 12 to help prevent delamination, which is common in current thermoset sandwich radomes. Through a climbing drum wheel test defined by the American Standard for Testing and Materials (ASTM), the sandwich panel with 3D fibers has tested to one order of magnitude improvement in the amount of torque required to peel or separate the skin from the core versus a panel that is identical except having zero 3D fibers. This testing proves the sandwich panel will not delaminate due to incidental loads from handling, transportation, flying objects, maintenance, and the like, which is why the term "non-delaminating" is used.

For a 3.0 GHZ radar installation, the outer and inner skins 24 and 22 panel 12 range from 0.020-0.040 inches thick. The foam core 23 measures approximately 1.00 inches thick. The 3D fibers 26 range from 2 insertion bundles per square inch to 4 insertion bundles per square inch. The panel skins 24 and 22 are made in the preferred embodiment with a thermoplastic composite of PETG and e-glass, but, in alternative embodiments, use any thermoplastic matrix from PP to PPS to PA to PEEK to PET, to PEI, or any of the myriads of thermoplastic resins available from the plastics industry. The foam 23 is any foam, but in the preferred embodiment is PET foam. The 3D fiber bundles 26 are a combination of thermoplastic fibers and e-glass, in any of a number of forms possible and available in the composites industry.

Figure 4:
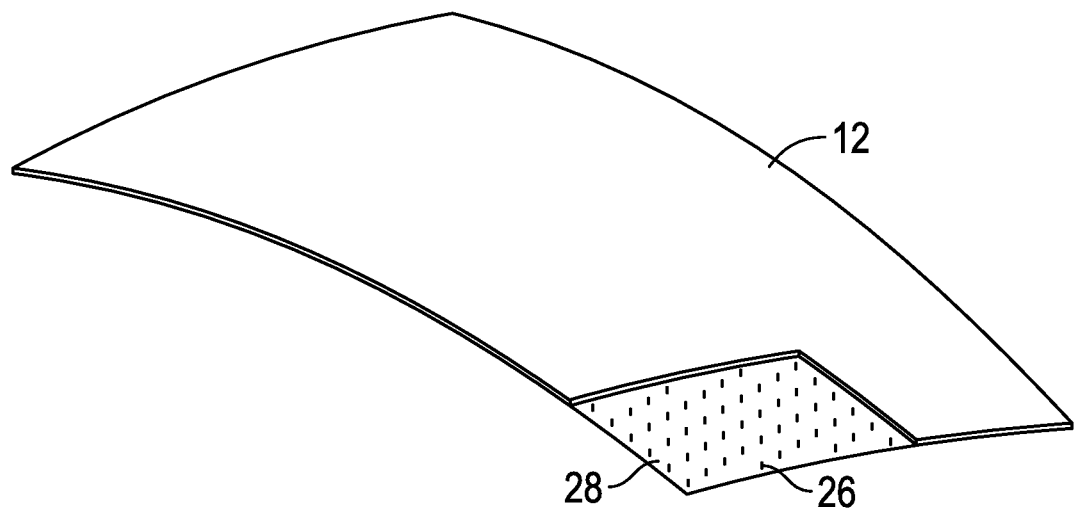
FIG. 4 shows some internal details of the panel of FIG. 3 with a large section of interior core removed and one skin surface removed.

FIG. 4 shows the single panel 12 with a section 28 illustrated. The section 28 exposes the internal makeup of the 3D fiber bundles 26 that interface and connect the outer and inner skins together, as 28 shows the outer skin and majority-of-foam removed for discussion purposes.

Figure 5:
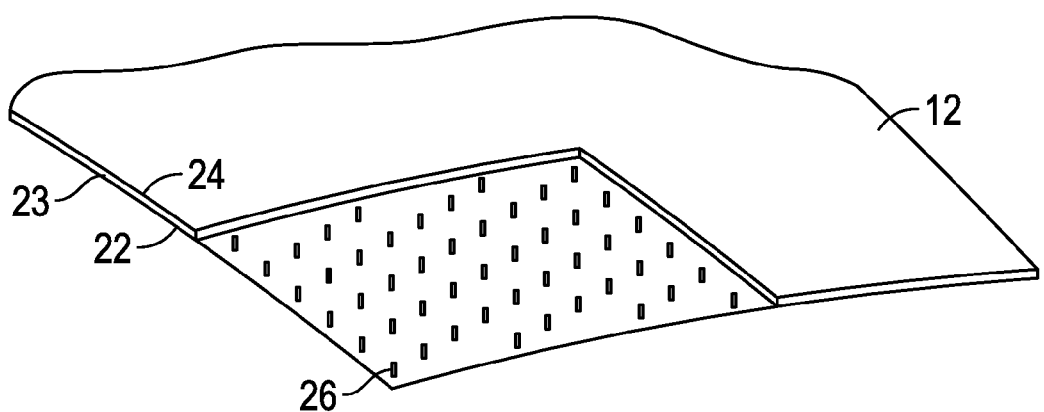
FIG. 5 shows a partial close-up view of FIG. 4.

FIG. 5 shows an even closer view of FIG. 4, illustrating a defined outer skin 24, an inner skin 22, and the foam interior 23. Note the connecting joint has not been formed in FIG. 5, and what is shown is a cut panel. U.S. Pat. No. 8,747,098, which is incorporated by reference herein, describes how to manufacture continuous curved thermoplastic composite sandwich panels, and panel 12 in FIG. 5 shows one of those panels. After the panel 12 is formed, a joint must be thermoformed and this is possible with thermoplastic composites (as opposed to the state-of-the-art in thermoset composites, which cannot be post-formed) and this thermoformed joint will be shown and discussed in FIGS. 6, 7, and 8. One of the 3D fiber bundles is shown as 26.

Figure 6:
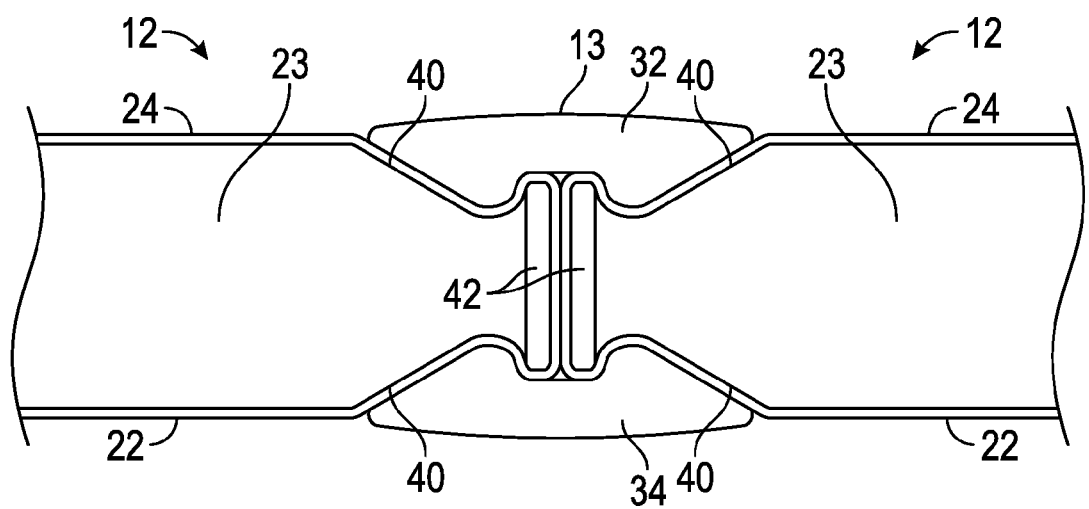
FIG. 6 shows a close-up cross-sectional view of an embodiment of a connecting joint in cross-section, displaying how the composite panels are joined in installation.

FIG. 6 shows a cross-section of connecting joint 13 discussed above with respect to FIG. 1. Now in FIG. 6 one can see the details of the connecting joint 13. Shown is a nominal 1.080 in. thick sandwich panel 12 connecting to a like panel 12 where the outer skin 24 is shown and an inner foam core 23 and an inner skin 22 are shown. Note that the outer skin 24 and the inner skin 22 are thermoformed into a curved joint edge 40, which is described in more detail later. The mating outer-most edges have a strip of thermoplastic composite added prior to thermoforming to give added compressive strength to the joint and these strips are shown as 42. The strips are about 2.5 times thicker than the skin 22 and are made from thermoplastic/e-glass in sheets about 15 feet long and 65 inches wide and the strips are water-jet cut to the correct arc of the interior-edge, given the diameter of the radome. When thermoformed, strips 42 co-mold and become part of a homogeneous composite that form the thermoformed curved joint edge 40.

Also in FIG. 6 is shown a new component necessary to complete the connecting joint 13 and that is an outer spline 32 and an inner spline 34, which in the preferred embodiment are identical and pultruded from a thermoset composite using either vinylester, polyester, epoxy, phenolic, or urethane resin, but also could be a thermoplastic composite. These splines 32, 34 are designed to be clamped with periodic fasteners 44 (e.g., fastening bolts) shown later in FIG. 8 (e.g., a fastening bolt clamps splines 32, 34 together every 4.0 inches or so depending on loading from wind and finite element analysis dictation on every edge, for example). After the edges have been thermoformed, each edge is machined with a "half-round" at the fastener location such that when two panels 12 are connected together the two half-rounds produce a round hole for the fastener egress. Note that the addition of the insert 42 allows the machining of the half-rounds without penetrating the foam interior and if fastener diameter needs to be increased, the thickness of insert 42 could be increased to accommodate a larger fastener.

Figure 19:
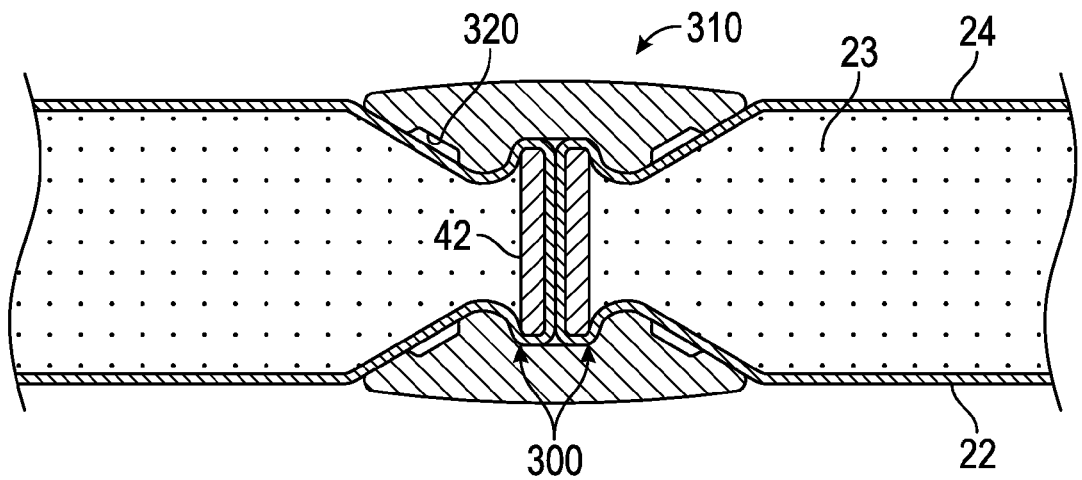
FIG. 19 illustrates an enlarged cross-sectional view of another embodiment of a connecting joint connecting adjacent edges of panels, with dual recesses added as features for accepting gasket type seal strips to prevent rain-intrusion.
Figure 20:
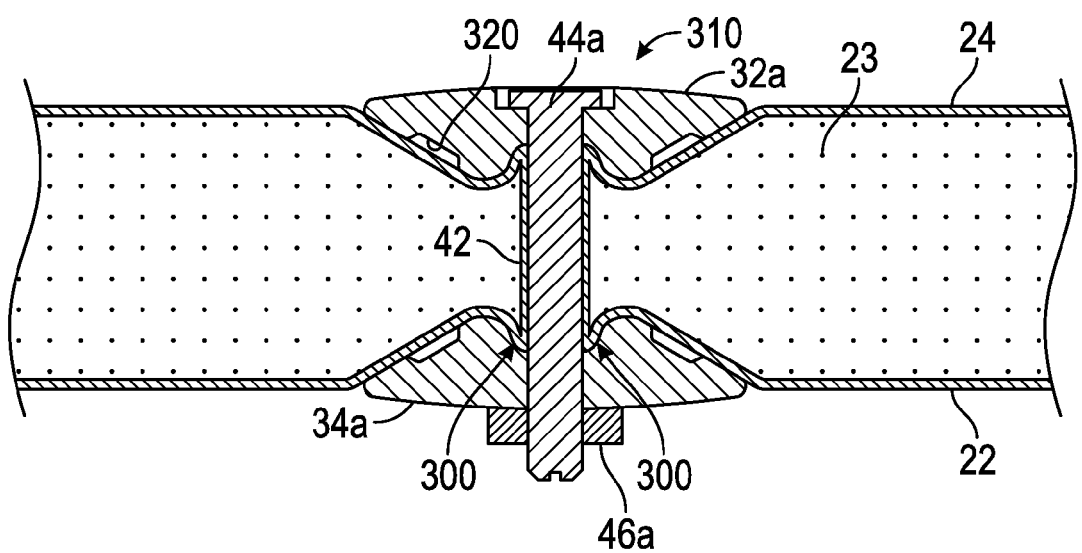
FIG. 20 illustrates another enlarged cross-sectional view of the embodiment of the connecting joint in FIG. 19.

The splines 32, 34 are preferably made of a pultruded thermoset composite, but could also be made of a thermoplastic composite. In one embodiment, the splines 32, 34, have a tuning grid installed to assist with RF transparency, which can be co-fabricated with the splines 32 and 34. A silicone sealing strip, rubber, or foam may be added to ensure no water penetration into the radome 10. FIGS. 19 and 20, which will be described later, show indentations 320 that allow the addition of narrow, continuous sealing strips.

Figure 7:
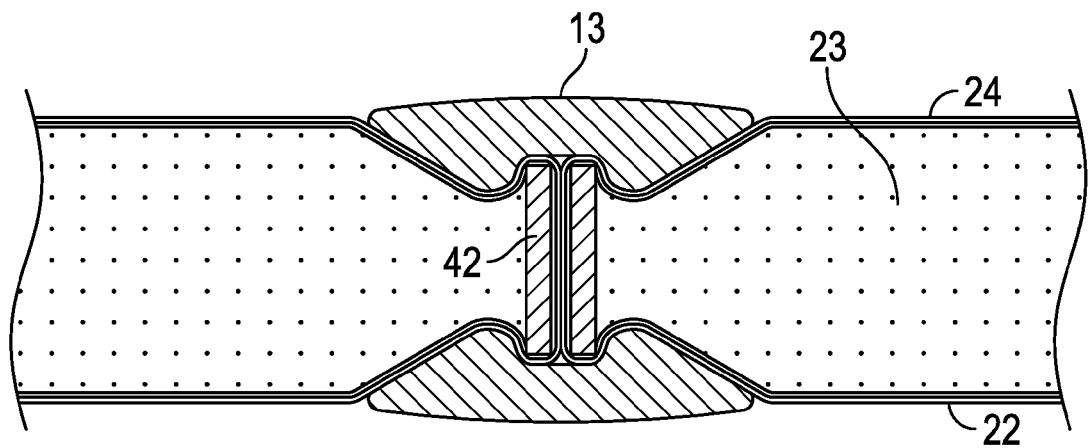
FIG. 7 illustrates an enlarged cross-sectional view of more details in cross section of FIG. 6.

FIG. 7 shows more detail of FIG. 6 with cross-sections cross-hatched. Not shown in either FIG. 6 or 7 are the 3D fiber bundles installed for non-delamination.

Figure 8:
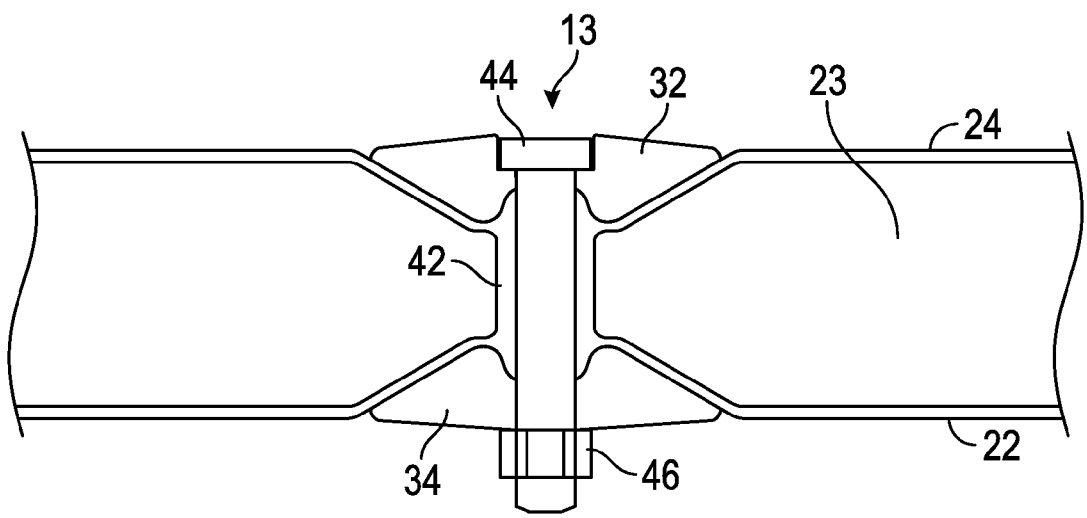
FIG. 8 shows a close-up cross-sectional view of an embodiment of a mechanical fastener cross-section, where periodically, a clamping and fastening means is added to complete the joint system.

FIG. 8 shows the joint 13 with a fastener 44 buried internally in recesses and holes in the outer spline 32 and fastener 44 can be generically described as a low headed bolt potted into the spline 32, but clearly could be any of numerous other fasteners. It is preferred that the OS fabric, the same as used on the radome panels, is bonded over the recessed bolt heads to make a smooth exterior and allowing no water penetration. Matching holes in the inner spline 34 allow fasteners to be locked in place with nuts 46. The connecting joint 13 is set-up such that the radome 10 can be assembled from the inside of the sphere. Also, if a panel ever needs to be removed, only the panel itself needs be disconnected on four edges and removed.

Figure 9:
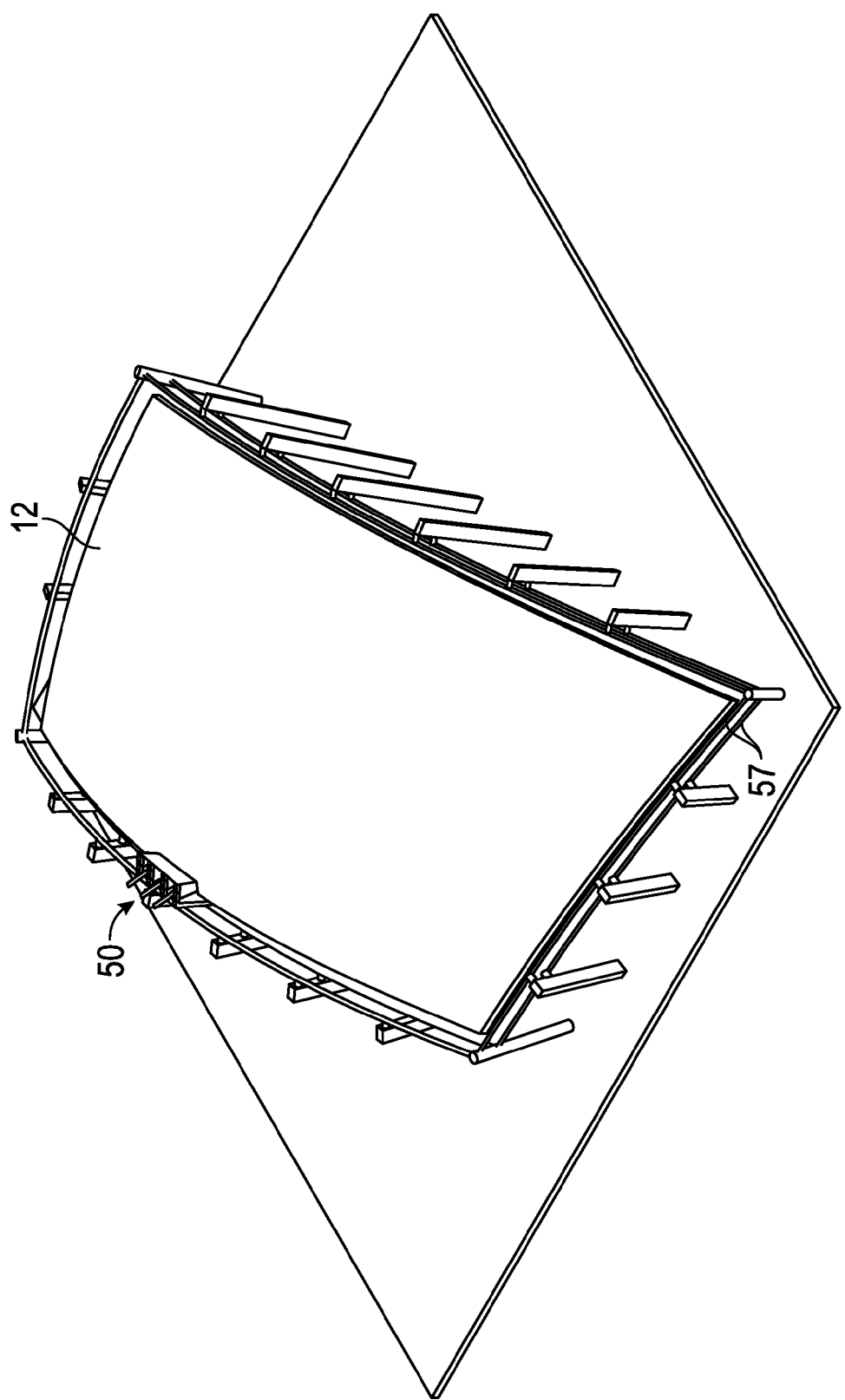
FIG. 9 shows a perspective view of a tool and process for thermoforming the composite panel edge previously shown in FIG. 6.

FIG. 9 shows a tool, which is a vacuum table with precise spherical curvature that holds or secures panel 12 in place while the edge connector details are thermoformed. A CNC tool that provides sequential heating cooling and forming around the edges of the panel 12 is shown as 50. The CNC tool 50 is motion-controlled so that it automatically can thermoform the joint edge details. The tool 50 travels around the perimeter of panel 12 on dual rails 57 and linear bearings.

Figure 10:
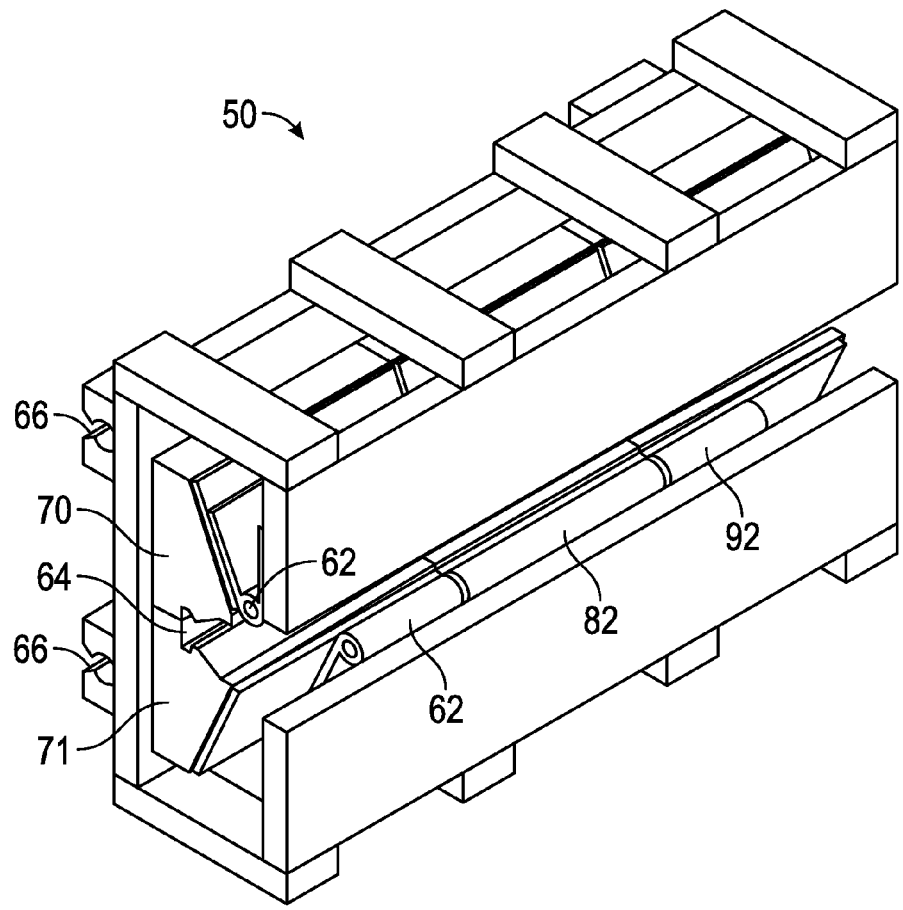
FIG. 10 shows a close-up perspective view of an embodiment of an edge-forming tool that travels around the perimeter of the thermoplastic composite radome panel, forming the close-out joint.

FIG. 10 shows further details of the edge-forming tool 50, which is shown in a fully clamped position. For clarity, there is no panel 12 in FIG. 10, but the shape of the tool 50 can be viewed as the void 64, which results from the tool clamping of clamping elements 70, 71 together, using hinges 62, 82, 92.

Also shown in FIG. 10 are linear bearings 66 which ride on the curved rails 57 shown in FIG. 9. Since the edge joint runs on a curved surface, the edge forming tool 50 has, in this embodiment, hinged section 62, 82, 92, showing three different sections of the tool 50 that can be sequentially rotated at different rates and displacements and each tool 50 can have heating to soften the composite skins and foam.

In an alternative embodiment, the tool 50 of FIG. 10 is operated by a single-arm robot; and the rails 56 are replaced with a rotating and indexing vacuum table, and the hinged tooling sections are replaced with a vertical actuation of the thermoforming-tooling, eliminating the complexity of the hinges. Many variations in this tool are possible without compromising the end formation of an identical thermoformed edge-joint 13.

Figure 12:
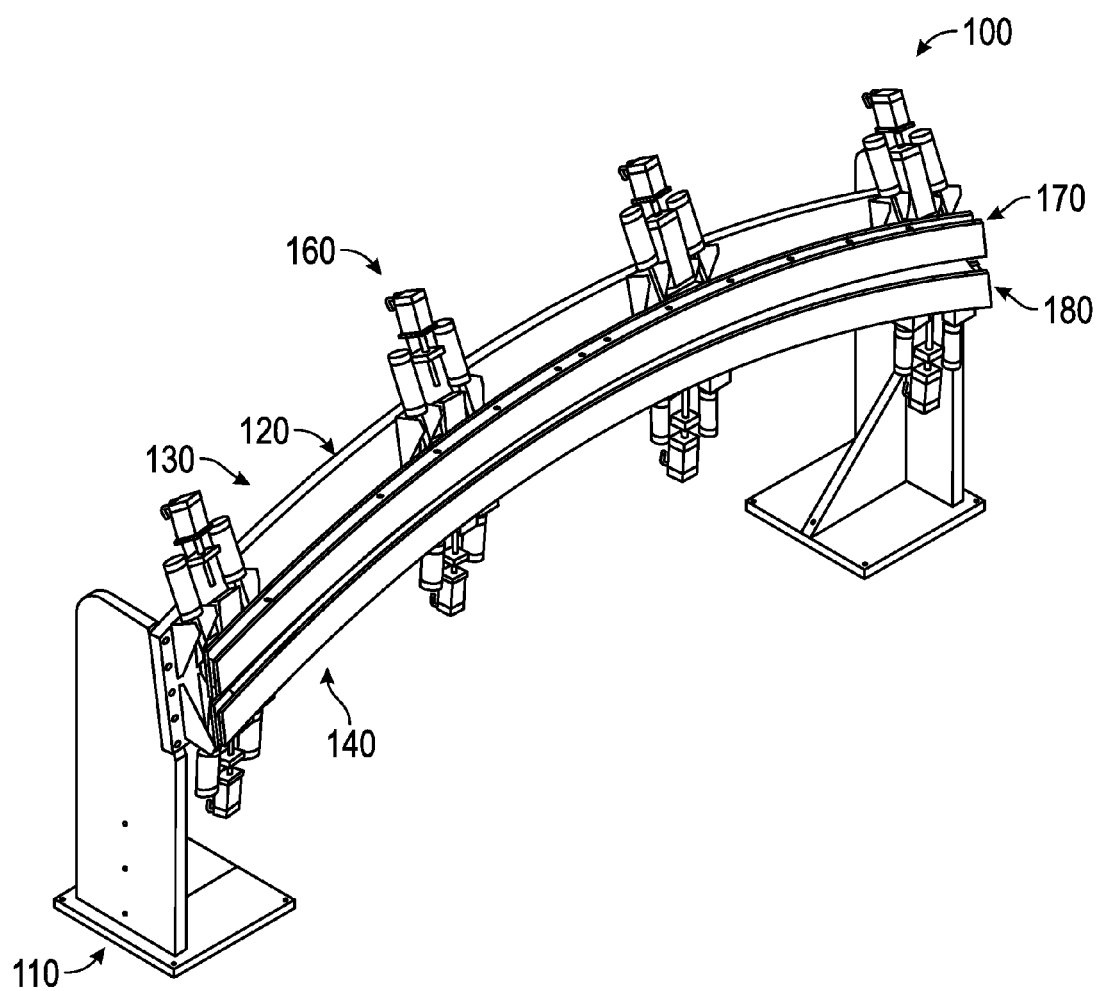
FIG. 12 is a perspective view of an alternative embodiment of an edge-forming tool.
Figure 13:
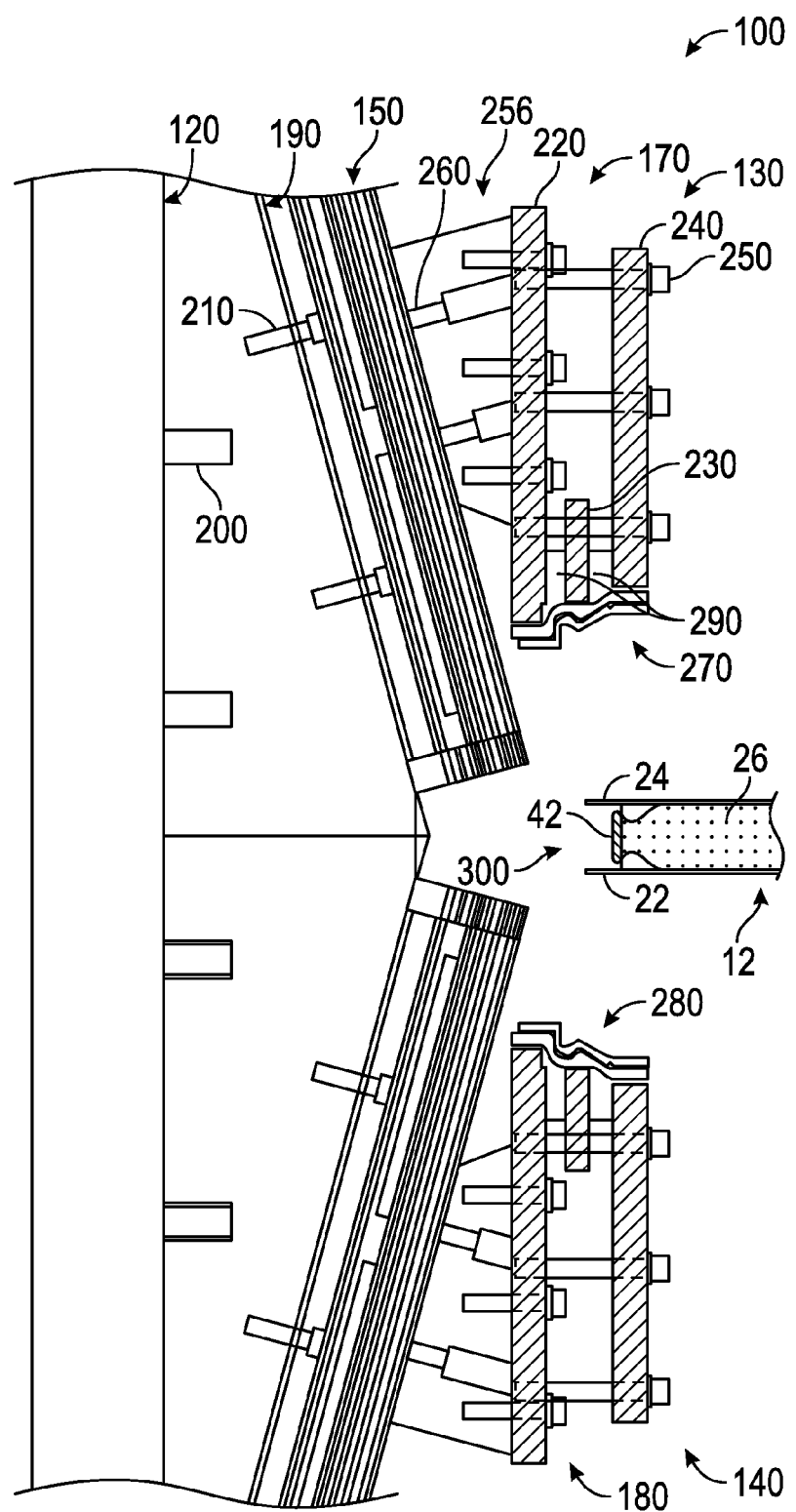
FIG. 13 is a cross-sectional view of a portion of the edge-forming tool of FIG. 12 with an edge of the panel being inserted into the edge-forming tool.
Figure 14:
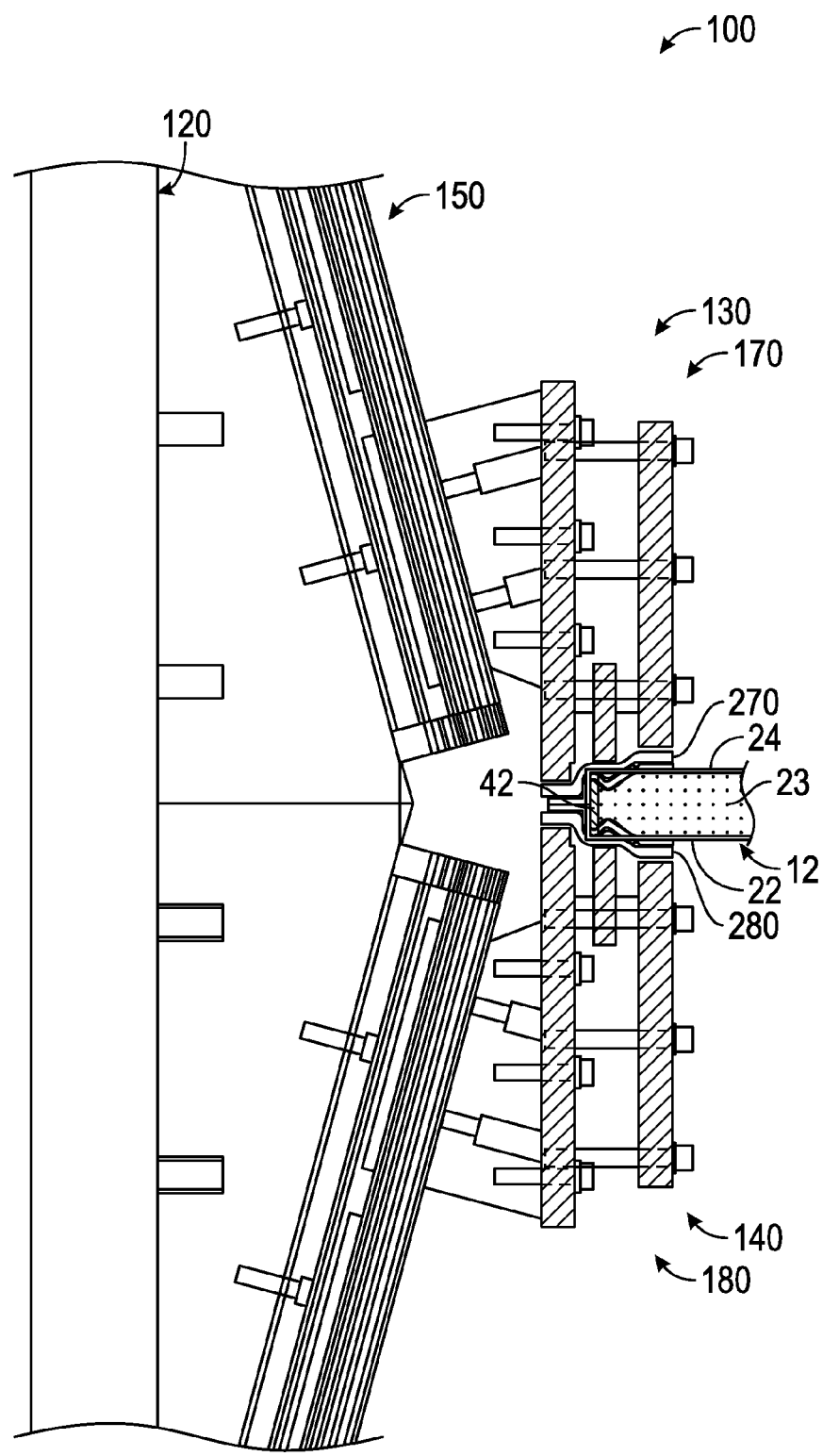
FIG. 14 is a cross-sectional view of a portion of the edge-forming tool of FIG. 12 with an edge of the panel being formed in the edge-forming tool.

With reference to FIGS. 12 to 14, an alternative embodiment of an edge-forming tool 100 will be described. The edge-forming tool 100 includes a frame assembly 110 with an elongated lateral frame support plate 120 that carries upper edge-forming mechanisms 130 and lower edge-forming mechanisms 140. Although four edge forming mechanisms 130, 140 are shown, in alternative embodiments, the edge-forming tool 100 includes other numbers (e.g., 1, 2, 3, 5, 6, etc.) of edge forming mechanisms 130, 140. Each edge forming mechanism 130, 140 is actuated by servo actuators 150 and air cylinders 160 for providing the significant force required. Each actuator 150 can provide sustained force of about 433 lbs so with four actuators on each side an approximate maximum sustained force of 1732 lbs. is provided by the actuators 150. The air cylinders 160 augment actuator motion. Eight 3 in. bore cylinders 160 on each side provide up to 565 lbs. each at 80 psi. for a total of about 4525 lbs. to meet the remainder of the force required for edge formation. The servo actuators 150 are coupled to upper and lower curved plate clamping elements 170, 180. The clamping elements 170, 180 allow for accurate positioning of the die surfaces 270 and 280, when thermoforming the edge of panel 12. The curved plate clamping elements 170, 180 employ either a film heating system or integrated cartridge heaters to provide directed heat to panel surface. In alternative embodiments, other heating mechanisms and/or cooling mechanisms are used.

The actuators 150 are coupled to frame support plate 120 through actuator mounting wedge blocks 190 and fasteners 200, 210.

The curved clamping elements 170, 180 include elongated, curved inner support plate 220, intermediate support plate 230, and outer support plate 240 coupled together by fasteners 250. The curved clamping elements 170, 180 are coupled to the actuators 150 by mounting blocks 256 and fasteners 260. Along a bottom of upper curved clamping element 170 is upper die member 270 and along a top of lower curved clamping element 180 is lower die member 280. Cooling channel(s) 290 are disposed adjacent to the die embers 270, 280 and between the support plates 220, 230, 240.

In use, edge 300 of panel 12 is inserted precisely at the correct location and secured via a vacuum table precisely coupled to the machine 100. Edge 300 is placed between the die members 270, 280, and the air cylinders and the actuators 150, which are controlled by a sophisticated motion control system, typically referred to as "CNC" for computer Numerical Control,) cause the die members 270, 280, which are heated by heating element(s) in the edge forming tool 100, to clamp together onto the edge 300, as shown in FIG. 14, causing the skins 22, 24 to thermoform around the strip 42 to form curved joint edge 40. Strip 42 co-molds and becomes part of a homogeneous composite that forms the thermoformed curved joint edge 40. After thermoforming, the curved joint edge is cooled, while the die surfaces remain fully closed. A fan cooling system circulates air through cooling channel(s) 290 to cool die during forming cycles and help maintain support plate dimensional stability. This chills the thermoplastic composite edge into a stable, lasting configuration. Thus, the edge forming tool 100 utilizes a heat/cool thermal cycle. A separate conventional 5-axis router and vacuum table precisely machines the perimeter of each panel 12, such that at each cross section of the panel 12, one would see edge 300, or the top and bottom skins cut precisely, with the tool bit always facing the hypothetical center of the radome sphere. Another tool then routes out the foam. The edge 300 (FIG. 13) shows the foam already thermoformed but, in fact, the foam does not take the shape of that shown in FIG. 13 until the dies have fully closed. The 5-axis router is a conventional machine. After the 4 edges have been thermoformed, the panel 12 is taken from the edge forming tool 100, and placed at a precise location again on the 5-axis outer vacuum table. The half-rounds are then machined into the edge to allow fastener egress.

The edge forming tool 100 allows one to form the joint profile on full length edge in single process in one thermal cycle. Four edges, once formed in four cycles, completes the entire edge detail for one panel 12.

With reference to FIGS. 15 to 20, an alternative embodiment of a connecting joint 310 will be described. Elements in connecting joint 310 that are similar to those shown and described with respect to connecting joint 13 and FIGS. 6-8 will be shown and described with like reference numbers, but with an "a" suffix and the description is incorporated herein.

Figure 15:
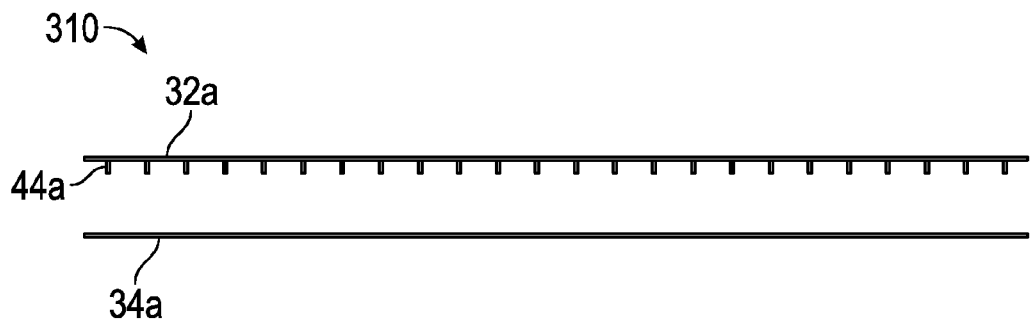
FIG. 15 is a simplified side-elevational view of an outer spline and an inner spline of an embodiment of a connecting joint.
Figure 16:
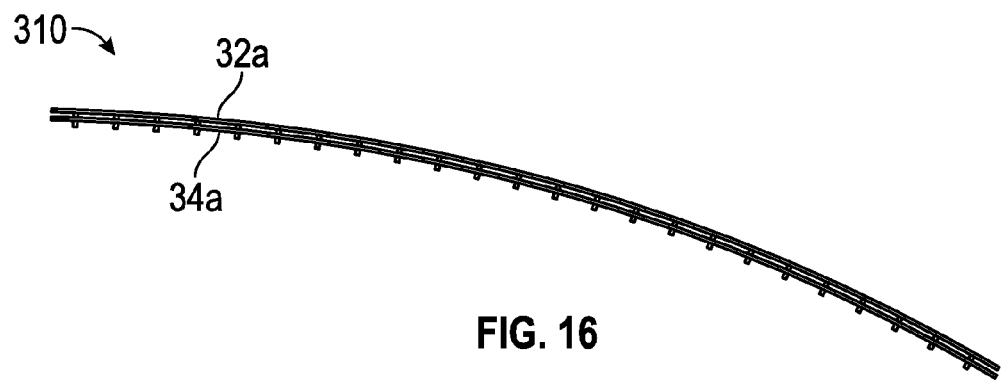
FIG. 16 is a simplified side-elevational view of a connecting joint formed by the splines of FIG. 15.

FIG. 15 shows outer spline 32a and inner spline 34a. The splines 32a, 34a include respective holes that receive fasteners 44a. The holes in the splines 32a, 34a that receive the fasteners 44a are offset from each other so that when the splines 32a, 34a are attached to each other via fasteners 44a and nuts 46a, the connecting joint 310 takes on a curved configuration as shown in FIG. 16 that substantially conforms with the curved configuration of the panel 12. Because there is an inherent nature of a pultrude spline to "stay" in a straight configuration, it behaves much like a spring, in that any bending must be sustained by a small bending force. By machining the holes in the inner spline at a precise smaller spacing the pair in FIG. 16 are spring loaded in the shape shown. The advantage of this is the nuts and lock washers can be pre-assembled and the installation personnel will be able to assemble multiple panels much faster than conventional radomes.

Figure 17:
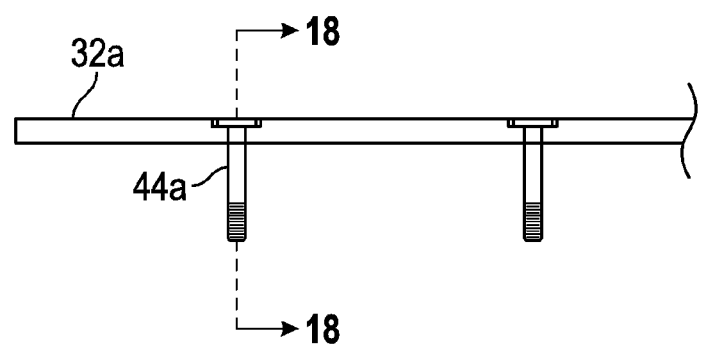
FIG. 17 is a cross-sectional view of the outer spline of the connecting joint and shows fasteners therein.
Figure 18:
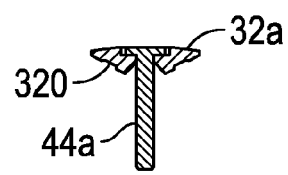
FIG. 18 is a cross-sectional view of the outer spline and fastener taken along lines 18-18 of FIG. 17.

FIGS. 17 and 18 show how the fasteners 44a are recessed in holes in the outer spline 32a and FIGS. 19 and 20 show how the connecting joint 310 connects adjacent edges 300 of panels 12 together. The splines 32a, 34a are similar to splines 32, 34 shown and discussed with respect to FIGS. 6-8, but include inner grooves 320. The grooves 320 allow a silicone-rubber or foam seal strip to be applied which may have 30% of its thickness compressed when installed and clamped via the fasteners. This eliminates rain-water intrusion. The inner spline 34a does not necessarily require a seal strip, however by making the splines identical, there is only one manufacturing run and die for producing all splines 32a and 34a.

The end result of this new and improved radome 10 is a robust design with zero maintenance over a 25-year life. The hydrophobic film or fabric-coating on the outside ensures a clean surface that will not weather or deteriorate with UV exposure, and will constantly bead water in rain for superior RF performance. The high impact resistance of the thermoplastic composite, coupled with the 3D fiber bundles provide exceptional resistance to damage from transportation loads, impact from flying objects, including sand and hail stones, abuse, and footprints due to maintenance of personnel walking the sides with slings and replacing aircraft warning lights, and other maintenance tasks. These impacts in the past with thermoset radomes have created localized delaminations, which quickly propagate into failed skins to cores, with the potential to have a fully failed radome.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A radome for housing a radar system, comprising:
a plurality of interconnected curved radome thermoplastic composite material panels, each curved radome thermoplastic composite material panel having a plurality of interconnecting edges, a foam core, an inner skin, an outer skin, and a plurality of three-dimensional fiber bundles tying the inner skin and the outer skin to each other through the foam core, inhibiting delamination, wherein the plurality of three-dimensional Z-axis fiber bundles include Z-axis fibers, which extend through the foam core from the inner skin to the outer skin, include opposite ends that are thermocured into and with the inner skin and outer skin.

2. The radome of claim 1, wherein the interconnecting edges each enclose and include a separate strip of thermoplastic composite to give added compressive strength to the interconnecting edges, and adjacent strips of adjacent interconnecting edges being parallel and adjacent to each other.

3. The radome of claim 1, further including curved connecting joints interconnecting the plurality of interconnected curved radome composite material panels along the interconnecting edges, each curved connecting joint including an outer spline, an inner spline and a plurality of fasteners holding the outer spline, inner spline and adjacent composite material strips from adjacent radome composite material panels together.

4. The radome of claim 3, wherein the outer spline and the inner spline include respective holes for receiving the fasteners, and the holes of the outer spline and the holes of the inner spline are offset from each other to cause a curved configuration in connected outer spline and inner spline.

5. The radome of claim 3, wherein the outer spline and the inner spline are made of a pultruded thermoset composite.

6. The radome of claim 1, wherein each radome composite material panel includes an outer hydrophobic coating with an outside of PTFE material and an inside of woven glass material, the outer hydrophobic coating co-molded with the curved radome thermoplastic composite material panel to create a co-molded outer skin.

7. The radome of claim 1, wherein the radome composite materials are RF-transparent A-sandwich composite material panels.

8. The radome of claim 1, wherein the curved radome thermoplastic composite material is made up of e-glass fiber and a heatable thermoplastic resin thermoformed into a specific shape, cooled, and set into a shape post-cooling.

9. The radome of claim 8, wherein the thermoplastic resin is at least one of polyethylene terephthalate glycol-modified (PETG) and polyethylene terephthalate (PET).

10. The radome of claim 1, wherein the inner skin includes two 0.015-0.025 inch thick PETG resin and glass fiber layers, forming a substantially 0.040 inch thick inner skin and wherein the plurality of three-dimensional fiber bundles include ends that are tied and thermocured between the two layers.

11. The radome of claim 1, wherein the outer skin includes one 0.015-0.025 inch thick PETG resin and glass fiber layer and one 0.015-0.025 inch thick fabric layer of hydrophobic material including an outside with PTFE and an inside with woven glass fiber, forming a 0.040 inch thick outer skin, and wherein the plurality of three-dimensional fiber bundles include ends that are tied and thermocured between the two layers.

12. The radome of claim 1, wherein the foam core is PET foam.

13. The radome of claim 1, wherein the interconnecting edges are thermoformed and taper inwardly and outwardly, and terminate in a butt joint.

14. The radome of claim 13, wherein the butt joints of two adjoining panels form a contact plane that is substantially at 90 degrees to a surface of the radome.

15. The radome of claim 1, wherein the radome forms a rhombic triacontahedron with individual identical panels.

16. The radome of claim 1, wherein the inner skin includes two layers, and the plurality of three-dimensional fiber bundles include ends that are tied and thermocured between the two layers.

* * * * *